Figure 1:
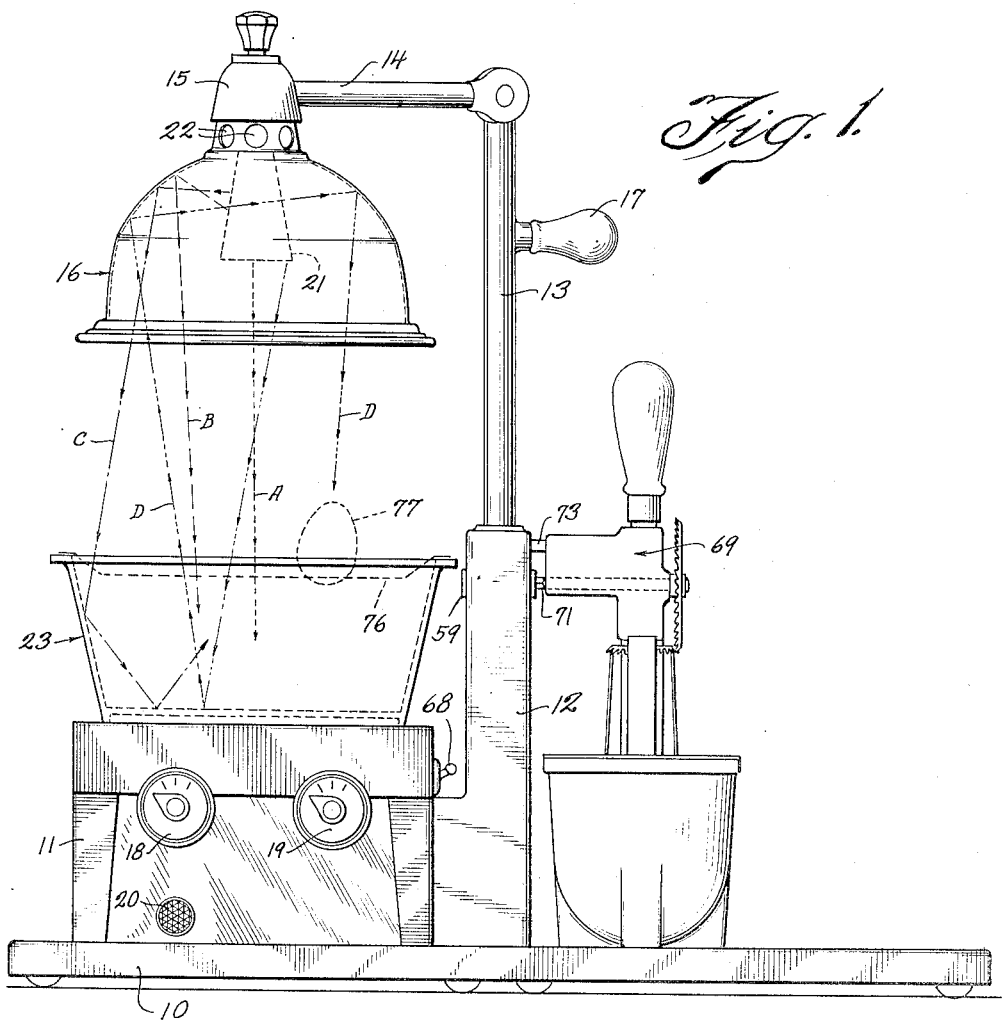

Oct. 13, 1936.　　G. F. DICKSON　　2,057,421
ELECTRIC COOKER
Filed July 22, 1935　　2 Sheets-Sheet 1

Inventor:
George F. Dickson
By Don J. Burrill
Atty.

Oct. 13, 1936.　　　　G. F. DICKSON　　　　2,057,421
ELECTRIC COOKER
Filed July 22, 1935　　　2 Sheets-Sheet 2
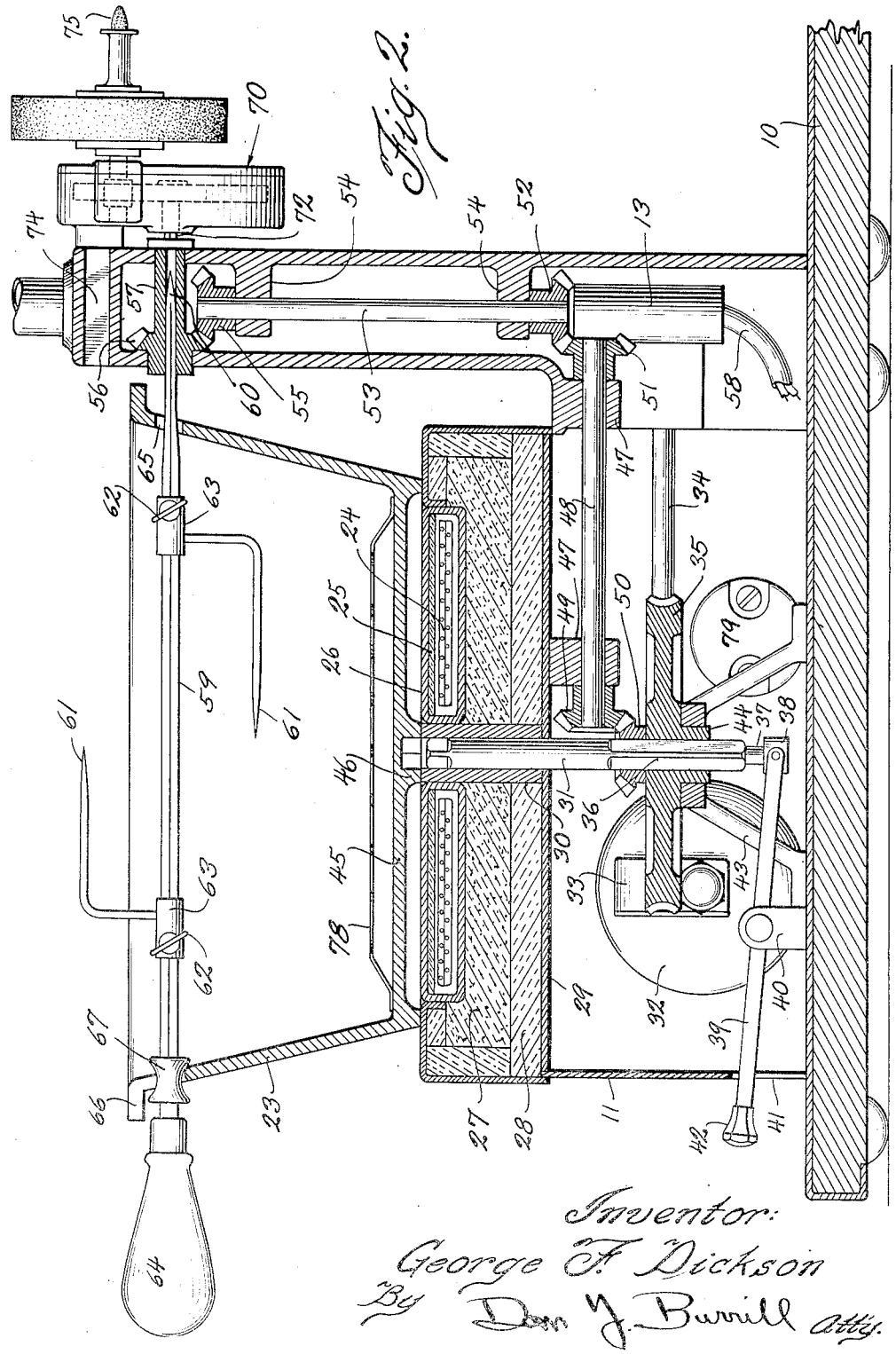
Inventor:
George F. Dickson
By Don J. Burrill atty.

Patented Oct. 13, 1936

2,057,421

UNITED STATES PATENT OFFICE 2,057,421

ELECTRIC COOKER

George F. Dickson, Chicago, Ill.

Application July 22, 1935, Serial No. 32,529

6 Claims. (Cl. 219—34)

This invention relates to an electric cooker.

The invention has particularly to do with a device in which foods are cooked by direct and reflected radiant heat, and which provides means for broiling, barbecuing, baking, boiling and performing other cooking operations. In addition to radiant heat, air spacing is provided for whereby heat by conductivity or convection may be avoided.

The objects of the invention include, among others, the provision of the following:

An improved electrical cooker;

A unique cooker utilizing radiant heat;

A cooking device using radiant heat and having means for increasing and decreasing the air space between the heating element and the items heated thereby;

An improved unitary device for performing a number of cooking operations;

A cooking device employing both direct radiant and reflected radiant heat and permitting of predetermined air spacing between the item being cooked and the heat radiating element with its reflector;

An electrical cooker employing direct and reflected radiant heat and also conducted heat.

These objects, and other objects which will hereinafter appear, are obtained by the novel combination, arrangement and construction of elements hereinafter described and claimed. One embodiment of the invention is illustrated in the accompanying two sheets of drawings, hereby made a part of the application, and in which:

Figure 1 is a front elevation of a device embodying the invention in one form and showing an attachment thereon; and Figure 2 is a fragmentary vertical cross section taken near the center of the device in a plane parallel to the plane of Figure 1, and showing another attachment on the device.

Like reference characters are used to designate similar parts in the drawings and in the following description.

The device shown in Figure 1 has a stand 11 mounted on a base 10 which extends beyond the main part of the device to provide a shelf. Stand 11 is enclosed on all sides. At one side, stand 11 has a vertical standard 12. Arising from standard 12 is a post 13, telescoping into standard 12. An arm 14 is pivoted to the top of post 13 and has at its end a socket enclosing casing 15 and a reflector 16 for a heat radiating element.

A handle 17 is provided to allow ready movement of post 13. At the front of stand 11 are two rheostats 18 and 19 which control the heating elements. Below rheostat 18 is a pilot light 20 which is energized when rheostat 18 is closed.

The reflector 16 is shaped to reflect heat rays from a selected point in front of the reflector substantially all in the same direction and upon an object in front of the reflector. The main part of the reflector surface, the upper part as it is shown in Figure 1, is curved to a substantially parabolic shape and is brightly polished to a highly reflecting surface. The portions near the edge need not be of the same curvature but should be shaped to help concentrate the heat rays. Such portions may also be polished but in the device shown are of a bright satin finish. The reflecting surface of the reflector is indicated in dotted lines in Figure 1.

A heating element 21 is inserted in the socket in casing 15 and extends from the socket into the reflector 16 to the point from which heat rays will best be concentrated by the reflector. Heating element 21 may comprise a coil of electric resistance wire on a porcelain standard. The standard is in the shape of a truncated cone with an extension at the small end to carry the plug to be screwed into the socket in the casing 15. The large end of the cone is open and faces downward, the smaller end with the plug being upward. Other radiating heating elements may be substituted for that described. Such heating elements can readily be purchased in the open market. A good quality of heating element should be used to insure best performance of the device.

At the top of reflector 16 are a plurality of apertures 22 which allow a current of air to move past the heating element and away therefrom through the wall of the reflector material.

Below the reflector 16 as it is shown in Figure 1 is a pan 23 of bright metal such as aluminum or stainless steel. The bottom area of pan 23 is about the same as the area of the open face of reflector 16. The sides of pan 23 flare outward at such angle that heat rays diverging from the heating element 21 and the reflector 16 will be reflected in toward the bottom of pan 23 and upon objects in the pan. The pan may be provided with a reenforcing rim.

In Figure 1 imaginary lines indicate the paths of the direct and reflected heat rays. Some of the rays (A) pass directly from the element to an object in the pan. Other rays (B) are reflected by the reflector on to the object in the pan. Still others (C) pass from the heating element to the reflector, thence to the side of the pan, and from the side of the pan are reflected inwardly upon the object in the pan. Some of the latter rays will heat the bottom of the object if it is raised from the bottom of the pan. Other heat rays (D) may strike the bottom of the pan, be reflected back to the reflector, and thence down again on to the object.

The proper spacing of the heating element 21 and reflector 16 above the pan 23 is important if best results are to be secured. Likewise the proper proportioning and the proper degree of flare for the sides of the pan is important.

In the device illustrated, the pan stands three and three-eighths inches high. The inside diameter of the bottom is seven and five-eighths inches. The diameter of the mouth of the pan is eight and seven-eighths inches. The sides of the pan thus flare five-eights of an inch. The heating element 21 in the reflector 16 is adjustably spaced from eleven and one-half to twelve and one-half inches above the bottom of the pan. The spacing is varied by telescoping the post 13 into or out of standard 12. It has been found that the one inch variation from eleven and one-half to twelve and one-half inches permits all necessary variations in the degree of heat produced. The closer the element is to the pan and the object in the pan the higher the temperature of the object will be.

As shown in Figure 2, at the center of the top of the stand 11 is a heating unit 24. Heating unit 24 comprises a coil or plurality of coils of electric resistance wire usually similar to that in the heating element 21 and wound in pancake form on a porcelain or other suitable heat proof refractory base. Over the top of the heating unit 24 is a sheet of mica 25. About the heating unit 24 and the mica sheet 25 is a casing 26, preferably of some metal which is a good conductor of heat and which does not melt at cooking temperatures. Swiss iron is found to be a satisfactory material for casing 26.

The top face of casing 26 forms the central part of the top of stand 11. Within stand 11 casing 26 is set in a heat insulating mixture of mica dust and asbestos wool. The insulating mixture is indicated at 27. About the insulating mixture 27 except adjacent casing 26 is a layer of asbestos 28. Below the asbestos is a metal partition 29 forming a part of the stand 11.

The heating unit 24 and the casing 26 are apertured in the center thereof. Through the aperture extends a bushing 30. The aperture of bushing 30 provides a bearing for a vertical shaft 31.

At the back of stand 11 is mounted a constant speed electric motor 32. The shaft of motor 32 carries a worm gear which drives a wheel, both enclosed in a casing 33 and not shown. The motor, worm, wheel and casing are of standard construction and form no part of this invention.

Affixed to a shaft 34 and driving a gear wheel 35 is a second worm gear (not shown). A collar 44 on wheel 35 is journaled in an aperture in a bracket 43 affixed to the base 10. A square aperture is provided at the center of wheel 35. The lower end 36 of shaft 31 is squared to slide nonrotatively within the aperture of wheel 35. Below the squared portion of shaft 31, shaft 31 has a reduced section 37 which rests in a cap 38. Cap 38 is pivoted to the inner end of an arm 39. A bracket 40 provides a fulcrum for arm 39 near its center. The outer end of arm 39 extends through a slot 41 in the side of stand 11 and terminates in a knob 42.

When knob 42 is depressed, cap 38 is raised lifting shaft 31 to a position such that the top end of shaft 31 extends above a top level of stand 11. The top end of shaft 31 is squared.

Pan 23 is provided with a raised bottom 45. The outer wall of pan 23 extends below the bottom 45 to form a ring upon which pan 23 rests. At the center of bottom 45 is a socket 46 apertured to receive the squared top end of shaft 31.

When shaft 31 is raised by depressing knob 42 the squared top end of shaft 31 becomes seated in socket 46. As the motor 32 turns, the wheel 35 is turned and with it turn the shaft 31 and pan 23. The rotation of pan 23 may be stopped while the motor continues to operate by raising knob 42 to lower shaft 31. A catch (not shown) may be provided to hold arm 39 in one or the other extreme position.

Journaled within suitable lugs 47 within casing 11 is a transverse shaft 48. Lugs 47 and shaft 48 are in the same vertical plane as shaft 31. A gear wheel 49 is affixed to the end of shaft 48 adjacent shaft 31. A second gear wheel 50 is mounted about the squared portion 36 of shaft 31 immediately above wheel 35. Gear 50 meshes with gear 49. As the wheel 35 is turned, gear 50 turns and drives gear 49 and shaft 48. A third gear wheel 51 is affixed to the outer end of shaft 48. Meshing with gear 51 is a fourth gear 52, affixed to the bottom end of a vertical shaft 53. Shaft 53 is journaled in lugs 54 within pillar 12. A fifth gear 55 is affixed to the top end of shaft 53 and meshes with a sixth gear 56. Gear 56 is mounted upon or is integral with a short shaft 57 which is journalled in the side walls of the vertical standard 12. Shaft 57 is provided with a square center aperture adapted to receive and drive shafts of attachments exterior to pillar 12. Shaft 57 comprises a low speed attachment drive, turning approximately four revolutions a minute.

Shaft 34, previously mentioned, extends into standard 12 and operates an attachment drive, not shown, but identical with that just described except that it turns at a higher rate of speed and is located at the far side of pillar 12 as shown in the drawings.

Post 13 extends into standard 12 between the fast and slow drives and is vertically slidable and rotatable within pillar 12 to provide for adjustment of the heating element 21 and reflector 16. A wire 58 to conduct electrical energy to the heating element 21 extends up through post 13.

Shaft 57, comprising the slow drive, is used to turn slowly moving appliances such as a square metal barbecue skewer 59. One end of the skewer is pointed at 60 and the shank of the pointed end is shaped to fit into the square socket in shaft 57. Away from the point 60 the shank of the skewer is enlarged and is squared to hold nonrotatively two or more holding points 61 set in collars 63 which may be adjusted along the skewer and set in selected positions thereon by means of thumb screws 62. A handle 64 is provided at the end of the skewer away from point 60.

The skewer 59 is used in conjunction with the pan 23. The pointed end 60 passes through a hole 65 near the top of the side of the pan. Near the handle end the shank of the skewer rests in a slot 66 in the side of the pan opposite hole 65. A collar 67 on the shank of the skewer provides a bearing in the slot 66. When using the barbecuing skewer a chicken or other piece of meat is placed on the skewer, usually by sticking the skewer through the meat, and the holding points 61 are forced into the meat to hold it in place. The pan 23 is placed in position at the center of the device and the pointed end 60 of the skewer run through hole 65 in the pan and into the socket in shaft 57, collar 67 dropping into the slot 66 in the opposite side of the pan. Heating element 21 is then turned on by the use of the rheostat 19. The motor is started by the use of a switch 68. The skewer and the meat thereon are turned four revolutions a minute. The heat rays from the heating element 21 in reflector 16 hit the meat directly and by reflections from the sides and bottom of pan 23. After a period of time depending on the nature and size of the piece of meat on the skewer the meat is cooked through and is removed from the skewer. The juices from the meat drip down into the pan 23 where they may be made into a gravy or otherwise used.

The fast drive is used to operate rapidly turning attachments such as an egg beater 69 or grinder 70. The operating shaft 71 of the egg beater, or 72 of the grinder, is inserted in the socket in the shaft of the fast drive. At the same time a holding pin 73 of the egg beater, or 74 of the grinder, is inserted into a socket near the top of standard 12. When the motor is turned on by the use of switch 68 the egg beater 69 or grinder 70 or any other similar attachment is operated at the desired speed.

In a way similar to that just described a slow moving attachment such as a dough kneader can be used with the slow drive.

When it is desired to evaporate a liquid or to cook a food in a liquid, the liquid and the food are placed on the device in pan 23. The heating unit 24 is turned on by rheostat 18. Pilot 20 shows when heating unit 24 is turned on. After the liquid or liquid and food in the pan 23 begins to simmer the heating element 21 in reflector 16 is positioned over the pan and turned on by the use of switch 19. Heating unit 24 may be turned off. The heat insulation around and under the unit 24 retains the heat therein that was stored up during the operation of the unit, and that heat aids in the cooking even after unit 24 is turned off. The heat of unit 24 and element 21 rapidly evaporates the liquid in the pan 23 and cooks the food therein. The evaporation of liquid therein takes place more from the surface than in the form of steam bubbles arising from the bottom of pan 23. Agitation of the liquid during rotation frees the vapors rapidly thus speeding vaporization. Such odors as arise from the pan are drawn upward with the heated air into the reflector 16, past heating element 21 and out through holes 22 above the heating element. In passing heating element 21, the air and vapors are raised to a high temperature so that many of the odiferous substances in the vapors are oxidized into odorless gases. The odors actually resulting from cooking in the present device are thus much less intense than those arising from another form of cooker.

When baking is to be done the prepared dough is placed in the bottom of pan 23. Heating unit 24 is turned on to brown the bottom of the dough. At the same time heating element 21 is turned on and the direct and reflected radiated heat bakes the dough. The motor 32 is turned on and shaft 31 raised by depressing knob 42, so that the pan is slowly rotated. The rotation promotes even baking. Heating unit 24 may be turned off as soon as the bottom of the dough is brown. The heat from element 21 completes the baking operation. The radiant heat from element 21 penetrates through to the inside of the dough causing a marked increase in the rising properties of the dough when compared to another cooking process.

Eggs may be baked in the present device without the use of water. First one end of the egg is held against a small stone burr 75 at the end of the shaft of the grinder 70, cutting a small hole in the end of the egg shell. The egg is then placed, hole upright, on a rack 76 set in the top of pan 23. The egg 77 and the rack 76 are indicated in dotted lines in Figure 1. As the egg bakes, the moisture in it is evaporated and passes out through the hole at the top of the egg. Without the hole the egg would burst. For baking eggs only radiant heat from element 21 is used. The pan 23 may be rotated.

Meats such as steak and the like may be broiled by placing them on a rack 78 in the bottom of pan 23 and using heat from the element 21 while rotating pan 23. The juices drip down into the bottom of the pan 23. Basting is not necessary. Unit 24 need be used only in making gravy from the juices.

Substantially any other food such as beans, potatoes and the like may be cooked in the pan 23. In general, unit 24 is used only during the first heating of the food. The continued cooking is carried on by the radiated heat from element 21. Toast may be made by using the radiated heat from element 21. Waffles and the like may be made in a waffle iron placed directly on unit 24.

Nuts may be roasted or corn popped in pan 23. For roasting nuts, a stirring rod is inserted into the socket shown occupied by holding post 14. The rod extends down into the pan and along its bottom. Element 21 is turned on and pan 23 is caused to rotate. Butter and salt where required are placed in the bottom of the pan. As the pan turns the stirring rod agitates and mixes the nuts and butter and salt. Heat from element 21 roasts the nuts. Coffee may be roasted in the same way, but without using butter and salt.

In the present device, the unit 24 produces a temperature of about four hundred degrees Fahrenheit at the bottom of pan 23. The radiated heat from element 21 and reflector 16 produces a temperature of over four hundred degrees in an object in the pan and having a surface reasonably well adapted to receive radiated heat. The use of both element 21 and unit 24 will heat an object in the pan to about six hundred degrees. Where desired, variation in the amount of heat from either or both the unit 24 and element 21 may be provided by using different settings of rheostats 18 and 19. Variation of heat from element 21 is also obtained by varying the distance of element 21 and reflector 16 above the object to be cooked.

The total current used by the present device is about one thousand eight hundred fifty watts, when both heating element and unit and the motor are on. The heating element 21 and unit 24 each consume from six hundred to one thousand watts. The motor 32 uses only a very small amount. To protect the wiring supplying the electric energy a fuse socket 79 to receive an ordinary fuse plug may be made a part of the device.

It is obvious that the present device may be made in a plurality of forms, such as one having two or more heating units 24, or one built into a portable table, the lower part of which contains storage shelves or the like.

What is claimed as new and is desired to be secured by Letters Patent of the United States is:

1. A cooker comprising a heat radiating element, a concentrating reflector thereabout, a bright metal pan beneath said element and having slightly flared sides, a heating unit beneath said pan, and means comprising a rotating part extending centrally of the heating unit to rotate said pan.

2. A cooker comprising a heat radiating element, a concentrating reflector thereabout, a heating unit beneath and opposed to said element, said unit having an aperture therethrough, a prime mover beneath said heating unit and having a rotary coupling protrusible through such aperture to above said unit, and a pan having sides adapted to reflect heat from said element inwardly of the pan and having a socket below the center of its bottom to receive said protrusible rotary coupling for rotation thereby.

3. A cooker comprising a stand having a pillar, a heat radiating element having a concentrating reflector thereabout mounted on said pillar and directed downwardly toward said stand, a heating unit having an aperture therethrough on said stand beneath and facing said heating element, a prime mover within said stand, a rotary coupling operated by said prime mover and protrusible through said aperture to above said heating unit, means for protruding and withdrawing said rotary coupling, a pan having sides adapted to reflect heat from said element inwardly of the pan and having a socket below the center of its bottom to receive said protrusible rotary coupling for rotation thereby, a rotary instrumentality operating socket on said pillar, and a second rotary coupling between said prime mover and said operating socket.

4. An egg preparing device comprising means for drilling a hole in an egg, a rack for said egg after drilled, a heat radiating element having a concentrating reflector thereabout above said rack, and a reflecting pan supporting said rack.

5. A cooker comprising a heat radiating element, a housing about said element comprising a concentrating reflector, and a constricted portion above said reflector and having apertures therethrough, and a receptacle for material to be cooked beneath said reflector, said radiating element being adapted to heat air, causing the air to pass upward in said reflector and out of the apertures in the constricted potion, vapors arising from material being cooked in said receptacle being drawn upward by such draft of air past the radiating element, and the heat from said element causing the vapors largely to lose their odiferous qualities.

6. A cooker comprising a heat radiating element, a concentrating reflector thereabout, a bright metal pan beneath said element and having slightly flared sides, a heating unit beneath said pan, said unit comprising an electric resistance mounted on a refractory base, and means to rotate the pan.

GEORGE F. DICKSON.